(12) United States Patent
Daniel

(10) Patent No.: US 8,125,371 B1
(45) Date of Patent: Feb. 28, 2012

(54) SYSTEM AND METHOD FOR REDUCING INCIDENCES OF FRIENDLY FIRE

(76) Inventor: Sayo Isaac Daniel, Miami, FL (US)

( * ) Notice: Subject to any disclaimer, the term of this patent is extended or adjusted under 35 U.S.C. 154(b) by 708 days.

(21) Appl. No.: 12/249,332

(22) Filed: Oct. 10, 2008

(51) Int. Cl.
*G01S 13/78* (2006.01)
*G01S 13/86* (2006.01)
*G01S 17/74* (2006.01)
*G01S 13/00* (2006.01)
*G01S 17/00* (2006.01)

(52) U.S. Cl. ........... 342/45; 342/42; 342/52; 342/53; 342/54; 342/175; 342/195; 89/1.11; 89/1.1; 42/70.01; 42/106; 398/106; 398/107; 398/108

(58) Field of Classification Search ........... 89/1.11, 89/1.1, 37.01, 41.01, 41.02, 41.07; 342/42–58, 342/60, 175, 195, 61; 42/70.01, 106, 1.01, 42/70.06; 398/106–108, 118, 126–130; 382/100, 382/103; 244/3.1–3.14; 356/300, 301; 340/1.1, 340/10.1, 10.3, 10.32
See application file for complete search history.

(56) References Cited

U.S. PATENT DOCUMENTS

| | | | | |
|---|---|---|---|---|
| 3,400,393 A * | 9/1968 | Ash | ............... | 89/41.07 |
| 3,738,593 A * | 6/1973 | Duvall | ............... | 244/3.14 |
| 4,731,879 A * | 3/1988 | Sepp et al. | ............... | 342/45 |
| 4,763,361 A * | 8/1988 | Honeycutt et al. | ............... | 398/108 |
| 5,202,783 A * | 4/1993 | Holland et al. | ............... | 398/108 |
| 5,231,400 A * | 7/1993 | Mouldin et al. | ............... | 342/45 |
| 5,299,227 A * | 3/1994 | Rose | ............... | 342/45 |
| 5,307,053 A * | 4/1994 | Wills et al. | ............... | 42/1.01 |
| 5,375,008 A * | 12/1994 | Guerreri | ............... | 342/45 |
| 5,396,243 A * | 3/1995 | Jalink et al. | ............... | 342/54 |
| 5,459,470 A * | 10/1995 | Wootton et al. | ............... | 342/45 |
| 5,583,507 A * | 12/1996 | D'Isepo et al. | ............... | 342/45 |
| 5,686,722 A * | 11/1997 | Dubois et al. | ............... | 342/45 |
| 5,767,802 A * | 6/1998 | Kosowsky et al. | ............... | 342/45 |
| 5,870,215 A * | 2/1999 | Milano et al. | ............... | 398/108 |
| 5,966,226 A * | 10/1999 | Gerber | ............... | 398/108 |
| 6,097,330 A * | 8/2000 | Kiser | ............... | 342/45 |
| 6,856,238 B2 * | 2/2005 | Wootton et al. | ............... | 42/70.06 |
| 6,986,302 B2 * | 1/2006 | LaFata | ............... | 89/1.11 |
| 7,046,358 B2 * | 5/2006 | Barker et al. | ............... | 356/301 |
| 7,047,861 B2 * | 5/2006 | Solomon | ............... | 89/1.11 |
| 7,055,420 B1 * | 6/2006 | Lois | ............... | 89/1.1 |
| 7,196,655 B1 * | 3/2007 | Hayles et al. | ............... | 342/45 |
| 7,263,206 B1 * | 8/2007 | Milbert | ............... | 382/103 |

(Continued)

FOREIGN PATENT DOCUMENTS

GB 2449675 A * 12/2008

*Primary Examiner* — Bernarr Gregory
(74) *Attorney, Agent, or Firm* — Sanford J. Asman

(57) ABSTRACT

The invention provides a system and method for reducing the instance of friendly fire by having the weapon aiming system include means for emitting an optical signal encoded with the identity of the targeting soldier. The encoded optical signal is received by an optical receiver on a targeted soldier where it is converted into a low power RF signal which is transmitted to a local repeater that retransmits it, optionally using at least one intermediate repeater, to a central monitoring station equipped with a computerized database. If the monitoring station determines that the doubly encoded signal includes the identities of two friendly troops, it transmits a "hold fire" signal back to the aiming system, and a suitable signal, such as a red LED indicative of a "hold fire" order is illuminated.

9 Claims, 4 Drawing Sheets

U.S. PATENT DOCUMENTS

| | | | |
|---|---|---|---|
| 7,308,202 B2 * | 12/2007 | Roes et al. | 398/108 |
| 7,573,369 B2 * | 8/2009 | Hayles et al. | 340/10.32 |
| 7,602,329 B2 * | 10/2009 | Manderville et al. | 342/45 |
| 7,831,150 B2 * | 11/2010 | Roes et al. | 398/130 |
| 2007/0236384 A1 * | 10/2007 | Ivtsenkov et al. | 342/45 |

* cited by examiner

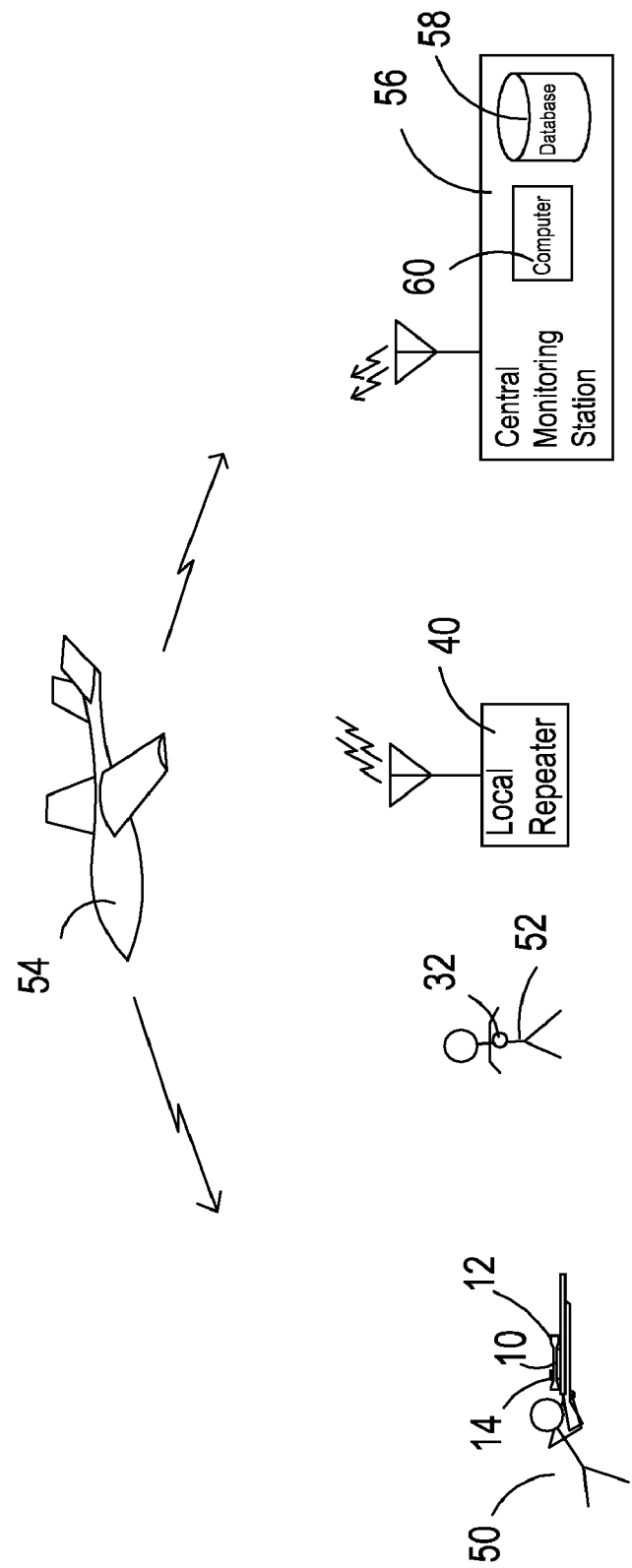

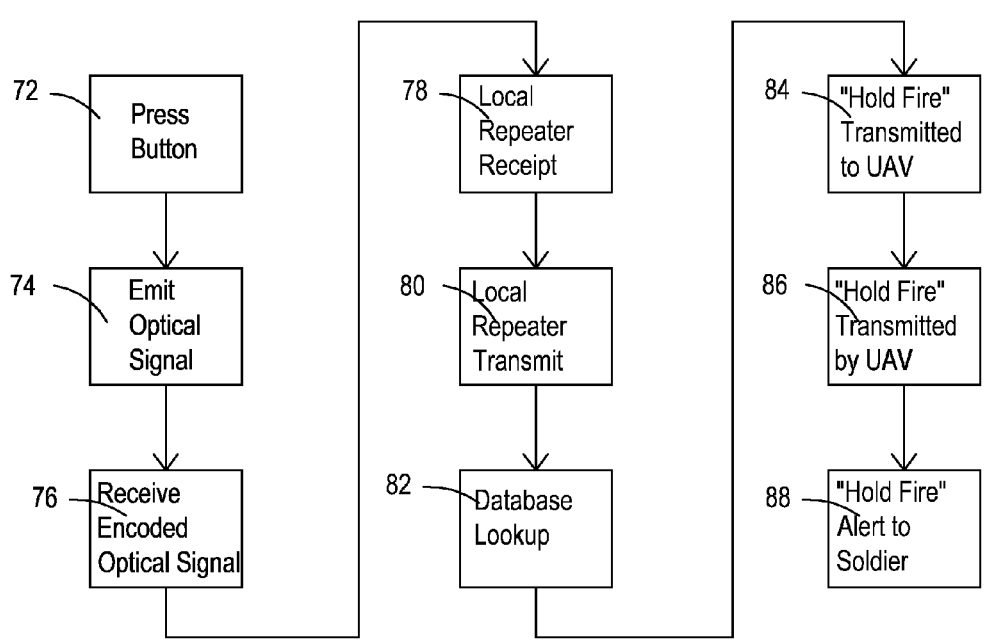

SYSTEM AND METHOD FOR REDUCING INCIDENCES OF FRIENDLY FIRE

BACKGROUND OF THE INVENTION

The present invention relates to a method and apparatus for diminishing incidences of "friendly fire". In particular, the invention relates to a covert device which can be used to identify and locate friendly forces in order to reduce the likelihood that they will be subjected to "friendly fire"

Military personnel use weapons, such as rifles, in combat. Heretofore, there have been numerous "friendly fire" instances in which friendly forces have been targeted, often with tragic results. Obviously, it would be highly desirable to avoid targeting and engaging friendly forces. However, heretofore, that has not always been possible due to miscommunications, or lack of communication, as to the locations of non-hostile forces. Accordingly, their engagement, in the mistaken belief that they were hostile has had tragic consequences.

While devices have, heretofore, been employed to provide means for identifying aircraft, including so-called "IFF" (Identification Friend of Foe) encoded transponders, such devices are too bulky to be carried on individual soldiers. Further, as such devices include both radio receivers (which must always remain active) and radio transmitters (which broadcast responses), their use on individual foot soldiers would require an ongoing supply of power.

Thus, while personal devices have been developed for use in games and for training military personnel, the operation of such devices have relied upon the fact that they would be used for only limited times, whereby battery power supplies could be used, with recharging between use. Thus, by way of example, so-called "laser tag" devices have been developed. "Laser Tag" is a team or individual sport where players attempt to score points by engaging targets, typically with a hand-held infrared-emitting targeting device. Infrared-sensitive targets are commonly worn by each player and are sometimes integrated within the arena in which the game is played. Although the name implies the use of lasers, real lasers are generally not used except as aiming devices. The actual transmitting element of almost all laser tag gear is an infrared Light Emitting Diode similar to those used in household remote controls. The computerized targeting device wielded by a player commonly emits a brief infrared beam which carries an identifying signal, and the target(s) record the signal when they are hit by the beam. In many cases, the targeting device also houses a visible laser to assist the player in aiming.

A known variation of laser tag, called Multiple Integrated Laser Engagement System or "MILES" has been used by the United States Armed Forces and other armed forces around the world for training purposes. MILES uses lasers and blank cartridges to simulate actual battle. Individual soldiers carry small laser receivers scattered over their bodies, which detect when the soldier has been illuminated (i.e., "fired upon") by a hostile soldiers firearm's laser. In MILES each laser transmitter is set to mimic the effective range of the weapon on which it is used.

Different versions of MILES systems are available both within the US and internationally. The capabilities of the individual systems can vary significantly but in general all modern systems carry information about the shooter, weapon and ammunition in the laser. When this information is received by the target, the target's MILES system determines the result of the "hit" using a random number roll and a table lookup. As a result a MILES emulating an M-16 rifle cannot destroy an Armored Personnel Carrier (APC), but could still kill a commander visible in the hatch of the vehicle. Vehicles are typically outfitted with a belt of laser sensors while dismounted troops often wear a vest or harness with sensors as well as a "halo" of sensors on their helmets. Often these MILES systems are coupled with a real-time data link allowing position and event data to be transmitted back to a central site for data collection and display. More sophisticated systems for tanks and APCs exist that use various techniques (including scanning lasers and coupled radio systems) to allow more precise targeting of armored vehicles.

Problems with adaptations of the MILES system for use in preventing actual friendly fire instances relate to the size and power restrictions required by MILES systems.

SUMMARY OF THE INVENTION

A method and apparatus for reducing the instances of "friendly fire" includes the use of an optical sensor which is able to detect a beam emitted by an optical illuminator. Upon detection of a suitable signal, which may be selectively encoded, the illuminated sensor sends a signal encoded with identifying data, to a central station, possibly using an airborne relay, where the identifications of both the soldier who has engaged the potential target and the potential target are made, whereby the central station can communicate that the potential target is a "friendly" who should not be engaged. Manned or unmanned airborne units may be used to relay communications, or an airborne unit may be used to house the central station.

In a preferred embodiment of the invention, the system is comprised of a rifle sight, such as telescopic sight, and the optical illuminator includes an emitter built into and aligned with the telescopic sight (or "scope"). The optical emitter is preferably an infrared emitter, whereby its beam cannot be seen. In a preferred embodiment, circuitry contained in the scope and associated with the optical emitter encodes the emitted optical beam with a code unique to each emitter. The circuitry associated with the emitter preferably includes also a radio receiver and means, such as LEDs which can be seen by the user of the scope, whereby a "go"/"no go" signal can be seen while sighting the weapon through the scope.

In accordance with the invention, optical sensors on troops include circuit means for receiving and decoding optical signals from the scope mounted optical emitters. The circuitry associated with the optical sensors includes a GPS locator and a transmitter which transmits the location of the receiver to a "central" monitoring station, which can include an airborne unit. The central monitoring station is able to decode the received signal and then transmit a signal to the targeting soldier's weapon, whereby the targeting soldier will receive a "no go" signal if the target is part of a friendly force.

BRIEF DESCRIPTION OF THE DRAWING

In the Drawing:

FIG. 5 is a pictorial diagram illustrating the operation of the invention; and

FIG. 6 is a flow chart illustrating the manner in which the inventive method works.

DETAILED DESCRIPTION OF THE PREFERRED EMBODIMENT

Instances of "friendly fire", in which non-hostile military personnel are targeted and engaged, should be avoided. Heretofore, that has not always been possible due to miscommunications, or lack of communication, as to the locations of non-hostile forces. Accordingly, their engagement, in the mistaken belief that they were hostile has had tragic consequences.

While devices have, heretofore, been employed to provide means for identifying aircraft, including so-called "IFF" (Identification Friend of Foe) encoded transponders, such devices are too bulky to be carried on individual soldiers. Further, as such devices include both radio receivers (which must always remain active) and radio transmitters (which broadcast responses), their use on individual foot soldiers would require an ongoing supply of power. Thus, existing laser tag or MILES systems cannot be adapted for use in the manner needed to enable them to be used for the present purposes. Further, as such prior systems included limitations relating to the capabilities of the emulated weaponry, in true combat situations their use would be limited.

Figure 1:
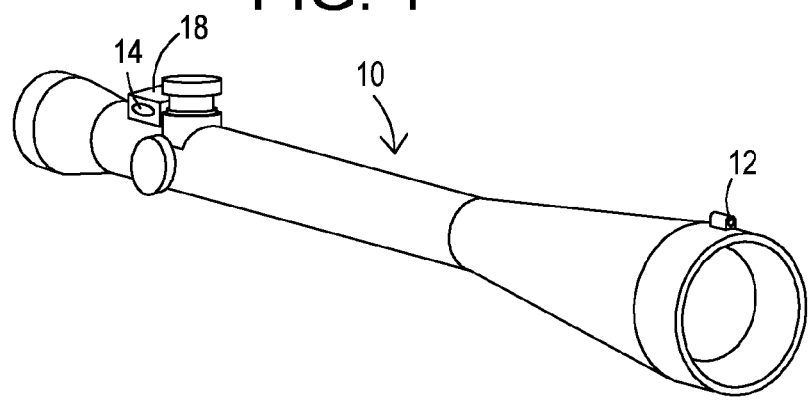
FIG. 1 is a perspective view of a telescopic sight of the type used with the present invention.

Referring to FIG. 1, in accordance with the present invention, a weapon, such as a rifle (not shown) is fitted with an aiming device, such as telescopic sight (or "scope") 10. The scope 10 is fitted with one or more optical emitting devices 12 which are used to emit an optical beam which is preferably in the infra-red spectrum, whereby it cannot be readily observed by people. As will be explained below, in the preferred embodiment of the invention, the beam transmitted by the optical emitting device 12 is encoded with an identification signal which identifies the soldier who is using the scope 10. A pushbutton 14 on the scope 10 selectively energizes the optical emitter 12 using a circuit 16 built into a housing 18 on the scope 10.

Figure 2:
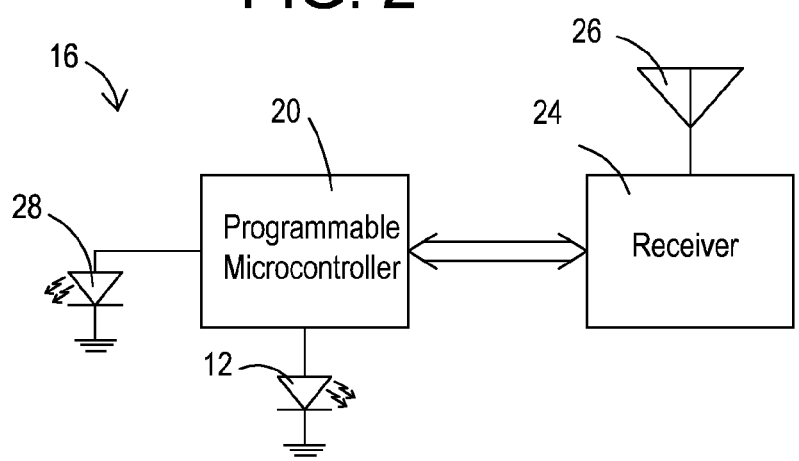
FIG. 2 is a block diagram of the electronics associated with the telescopic sight of FIG. 1.

Referring to FIG. 2, a block diagram of the circuit 16 built into the scope 10 (FIG. 1) and associated with the optical emitter 12 and the pushbutton switch 14 is shown. In accordance with the invention the circuit 16 includes a programmable microcontroller 20 and a power supply 22, which may be comprised of button type cells. The circuit 16 also includes a receiver 24 which is connected to an antenna 26 mounted on the scope 10. A light emitter, such as a red LED 28 is mounted such that it can be seen by a soldier using the scope 10. By way of example it may be mounted on the scope 10 with circuit 16, with an opening formed which allows light from the LED 28 to be seen within the scope 10. When the soldier using the scope 10 engages a target and presses the pushbutton 14 the optical emitter 12 transmits an encoded optical signal which is aligned with the scope 10. The encoded optical signal is encoded with the identification of the targeting soldier.

Figure 3:
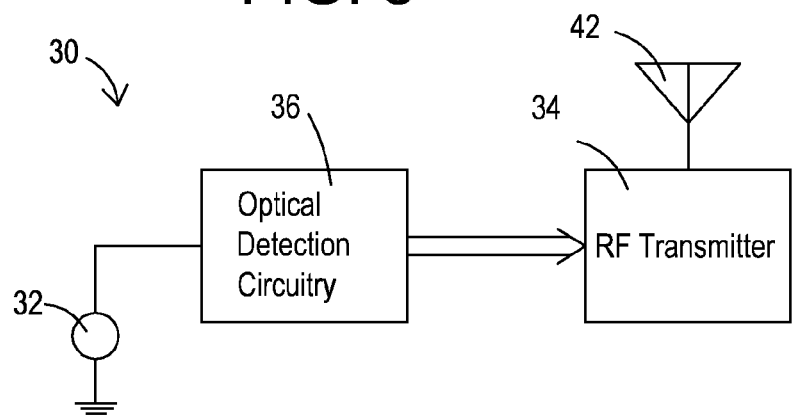
FIG. 3 is a block diagram of the electronics associated with the optical receiver RF encoder and transmitter worn by a soldier.

With reference to FIG. 3, a receptor circuit 30 worn by friendly forces includes an optical sensor 32 and a short range radio frequency transmitter 34 which is designed to have a very low power drain until it is energized by optical detection circuitry 36. When the optical sensor 32 detects an illuminating signal (e.g., from the circuit 16 mounted on the scope 10), the transmitter 34 is energized, and it retransmits the encoded optical signal (as detected) to a nearby local repeater device 40 using antenna 42.

Figure 4:
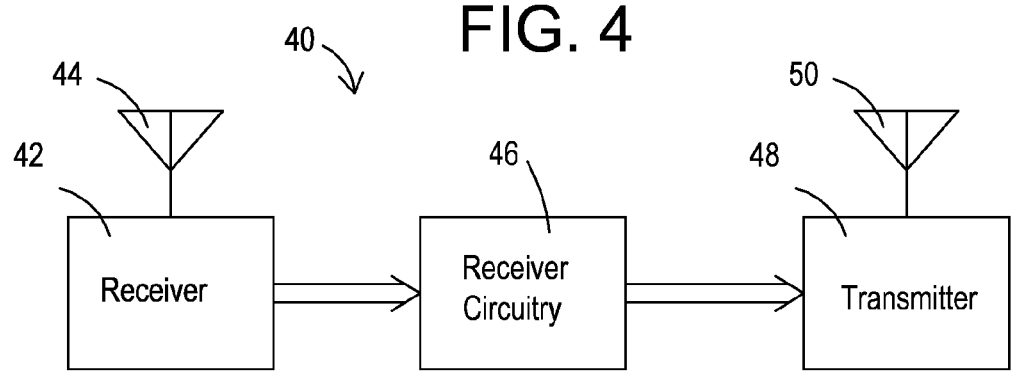
FIG. 4 is a block diagram of the local repeater used with the optical receiver RF encoder and transmitter of FIG. 3.

Referring now to FIG. 4, a block diagram of the local repeater 40 is shown. As illustrated, the local repeater 40 which preferably includes a receiver 42, which uses an antenna 44 to receive signals from nearby circuits 16. The received signals are processed by receiver circuitry 46, and then transmitted by transmitter 48 using antenna 50.

Referring now to FIG. 5 and FIG. 6, an overview of the operation of the invention is illustrated in FIG. 5, with a block diagram of the method illustrated in FIG. 6. As shown, when a soldier 50 aims at a friendly soldier 52, and the soldier presses the button 14 on the scope 10 on his rifle, an encoded infrared beam is emitted by the emitter 12 on the scope 10 and the encoded optical beam is picked up by the sensor 32 on the soldier 52, causing the associated electronic unit 30 on the soldier 52 to convert the optically encoded signal into a radio frequency ("RF") signals which is transmitted by transmitter 34 on the soldier 52. That RF signal is picked up by local repeater 40 which retransmits it. The retransmitted signal from local repeater 40 is picked up by suitable means, such as by an unmanned aerial vehicle ("UAV") 54. The UAV is able to relay the encoded signal back to a central monitoring station 56 at which the encoded signal, which has been encoded with identification information from both soldiers 50, 52, is decoded. The central monitoring station 56 uses the decoded signal to determine the identities of the soldiers 50, 52 using a database 58 associated with a computer 60. If they are both "friendlies", the central monitoring station 56 transmits a "hold fire" signal, which can be relayed by the UAV 54 back to the circuit 16 in the scope 10, whereby the circuit 16 will immediately cause the "hold fire" LED 28 in the scope 10 to light up, thereby identifying the targeted soldier 52 as a friendly who should not be fired upon.

The foregoing steps of the present inventive method are illustrated in the block diagram 70 in FIG. 6, in which the soldier 50 targets soldier 52 and presses button 14 at 72. This causes an optical signal, encoded with the identity of soldier 50 to be emitted by emitter 12 at step 74. At step 76, the encoded optical signal is received by circuit 36 on soldier 52, and it is retransmitted as an RF signal which has been further encoded with the identity of soldier 52, whereby the RF signal includes encoded identification of both soldiers 50, 52. At step 78 the doubly encoded signal is received by local repeater 40, which retransmits it. The retransmitted signal is received by UAV 54 which retransmits it to the central monitoring station 56 at step 80. The a computer 60 within the central monitoring station 56 performs a lookup of the encoded identities of the soldiers 50, 52 in database 58 at step 82, and if the lookup shows that both soldiers 50, 52 are "friendly", then a "hold fire" signal is transmitted back to UAV 54 which retransmits it to the circuitry 16 in the scope 10 of soldier 50 at steps 84, 86, where the circuitry 16 causes the "hold fire" LED 28 in the scope 10 to alert soldier 50 that he should not fire on friendly soldier 52 at step 88.

In a preferred embodiment of the invention, the local repeater 40 further encodes the signal sent to the UAV 54 with a location signal, such as one derived by a GPS receiver within the local repeater 40, whereby the monitoring station 56 can be updated with the location of soldier 52. Also, if the monitoring station 56 is aware of the general location of soldier 50, e.g., that he is in the general location of soldier 52, then the monitoring station 56 can be more selective about the UAV or other repeater means which it uses to transmit the "hold fire" signal to soldier 50.

While the invention has been described with reference to a preferred embodiment, those skilled in the art will recognize that the UAV 54 which acts as an intermediate repeater could be replaced by a manned aircraft, a low earth orbit satellite, or a repeater on a hill or other suitable area. If the area occupied by the local repeater is sufficiently close to the central monitoring station, or if RF conditions are appropriate, it may be possible to avoid the use of an intermediate repeater to send the signal to the central monitoring station, although it would generally be best to have an intermediate repeater send the "hold fire" signal from the central monitoring station 56 back to the soldier 50 to insure that it is received, although depending on frequency, atmospherics, and distance, it may be possible to avoid an intermediate repeater in sending the "hold fire" signal, as well.

As will be obvious to those skilled in the art, the present invention has been described in a preferred embodiment which is to be limited solely by the scope of the claims herein.

I claim:

1. A system for reducing the incidence of friendly fire comprising:
    (a) illuminator means for emitting an optical beam at a target, said illuminator means being mounted on a weapon aiming device and being selectively energizable by a person operating said weapon;
    (b) illuminating circuit means for encoding said illuminator means, said illuminating circuit means including means for encoding said optical beam with an identification code associated with said illuminating circuit means, said illuminating circuit means further comprising a "hold fire" indicator which can be activated by illuminating circuit controller means for indicating to said person that said weapon is targeting friendly forces, said illuminating means further comprising illuminating circuit receiver means for receiving a control signal indicative of the targeting of friendly forces and for causing said illuminating circuit controller means to activate said "hold fire" indicator;
    (c) optical sensor means, associated with an optical receiver circuit, said optical receiver circuit further comprising a short range radio frequency transmitter, said optical receiver circuit being adapted to transmit a short range radio signal which is encoded with said identification data contained in said received optical signal;
    (d) a local repeater comprising a radio frequency receiver for receiving said short range radio signal and a transmitter for transmitting a radio frequency signal encoded with said identification data contained in said received optical signal, and a repeater identification code representative of said local repeater;
    (e) a central monitoring station for receiving said radio frequency signal from said local repeater, said central monitoring station including database means for decoding said identification signals and transmitter means for transmitting a "hold fire" signal if said identification signals are both representative of friendly forces,
    whereby upon receipt of said "hold fire" signal by said illuminating circuit receiver means, said illuminating circuit controller means will activate said "hold fire" indicator in said illuminating circuit to indicate that said weapon is targeting friendly forces.

2. The system of claim 1 in which said weapon aiming device comprises a telescopic sight and said weapon is a rifle.

3. The system of claim 2 wherein said illuminator means is an infrared emitter.

4. The system of claim 3 wherein said infrared emitter is selectively energized by pressing a push button on said telescopic sight.

5. The system of claim 1 wherein said illuminating circuit means for encoding said illuminator means, said "hold fire" indicator comprises a red LED.

6. The system of claim 1 wherein said local repeater further comprises location determining means for determining its own position.

7. The system of claim 6 wherein said location determining means comprises a GPS receiver, and said radio frequency signal transmitted by said local repeater further comprises means for encoding and transmitting the location of said local repeater.

8. The system of claim 1 wherein said database means comprises a digital computer and a database, said database including data representative of the identification of soldiers and other assets.

9. A method for reducing the incidence of friendly fire comprising:
    (a) selectively emitting an optical beam at a target, said optical being encoded with the identification of a person who selectively emits said optical beam, said optical beam being emitted by a weapon aiming device operated by said person;
    (b) providing means for receiving said encoded optical beam and retransmitting a radio signal, said retransmitted radio signal being further encoded with an identification code indicative of the person who has said means for receiving said encoded optical beam;
    (c) providing centralized means for determining the identities of the person associated with said emitted optical beam and said person associated with said retransmitted radio frequency signal;
    (d) determining whether said persons associated with said emitted optical beam and said retransmitted radio frequency signal are both friendly;
    (e) transmitting a "hold fire" signal if said persons associated with said emitted optical beam and said retransmitted radio frequency signal are both friendly; and
    (f) causing a "hold fire" indicator to be observed by said person associated with said emitted optical beam.

* * * * *